United States Patent
Kim et al.

(10) Patent No.: US 9,746,111 B2
(45) Date of Patent: Aug. 29, 2017

(54) HYDRAULIC TUBE FOR VEHICLE

(71) Applicants: Hyundai Motor Company, Seoul (KR); Hanil Tube Corp., Incheon (KR)

(72) Inventors: Bum Jun Kim, Bucheon-si (KR); Min Keun Kwon, Bucheon-si (KR); Eun Sik Kim, Gwangmyeong-si (KR); Seong Hwa Choo, Incheon (KR); Jeong Ho Lim, Incheon (KR)

(73) Assignees: Hyundai Motor Company, Seoul (KR); Hanil Tube Corp., Incheon (KR)

( * ) Notice: Subject to any disclaimer, the term of this patent is extended or adjusted under 35 U.S.C. 154(b) by 273 days.

(21) Appl. No.: 14/489,015

(22) Filed: Sep. 17, 2014

(65) Prior Publication Data

US 2015/0176729 A1   Jun. 25, 2015

(30) Foreign Application Priority Data

Dec. 20, 2013  (KR) .......................... 10-2013-0160619

(51) Int. Cl.
| | | |
|---|---|---|
| F16L 19/00 | (2006.01) |
| F16L 21/00 | (2006.01) |
| F16L 37/00 | (2006.01) |
| F16L 23/028 | (2006.01) |

(52) U.S. Cl.
CPC ........... *F16L 21/00* (2013.01); *F16L 23/0283* (2013.01); *F16L 37/00* (2013.01)

(58) Field of Classification Search
USPC ............................................. 285/293.1, 347
See application file for complete search history.

(56) References Cited

U.S. PATENT DOCUMENTS

| | | | | |
|---|---|---|---|---|
| 6,454,314 | B1 * | 9/2002 | Grosspietsch | F16L 37/02 285/319 |
| 7,614,666 | B2 * | 11/2009 | Eggert | B60T 17/043 285/293.1 |
| 8,042,839 | B2 * | 10/2011 | Rammhofer | F16L 23/0283 285/215 |
| 2006/0082146 | A1 | 4/2006 | Heim et al. | |
| 2007/0228731 | A1 * | 10/2007 | Elflein | F16L 37/088 285/347 |
| 2007/0241559 | A1 | 10/2007 | Rammhofer et al. | |

FOREIGN PATENT DOCUMENTS

| | | |
|---|---|---|
| JP | 9-317973 A | 12/1997 |
| JP | 11-20659 A | 1/1999 |
| JP | 2005-525517 A | 8/2005 |
| KR | 10-2006-0113128 A | 11/2006 |
| KR | 10-0646409 B1 | 11/2006 |
| KR | 10-2008-0097120 A | 11/2008 |
| KR | 10-2011-0001614 A | 1/2011 |

* cited by examiner

*Primary Examiner* — Aaron Dunwoody
(74) *Attorney, Agent, or Firm* — Morgan, Lewis & Bockius LLP

(57) ABSTRACT

A hydraulic tube for a vehicle may include a pipe having a pipe rib which may be formed integrally on and protrudes outward from a terminal end of the pipe, a connector fitted around the pipe such that the pipe extends through opposite ends of the connector, and a sealer fitted into a first end of the connector, a first end of the sealer being coupled with the terminal end of the pipe through coupling with the pipe rib, and a second end of the sealer being coupled with the first end of the connector.

7 Claims, 4 Drawing Sheets

HYDRAULIC TUBE FOR VEHICLE

CROSS-REFERENCE(S) TO RELATED APPLICATION

The present application claims priority of Korean Patent Application Number 10-2013-0160619 filed on Dec. 20, 2013, the entire contents of which application is incorporated herein for all purposes by this reference.

BACKGROUND OF THE INVENTION

Field of the Invention

The present invention relates to a hydraulic tube for a vehicle, and more particularly, to a hydraulic tube which has improved performance for preventing oil leakage.

Description of Related Art

Referring to FIG. 1, a clutch system using hydraulic power employs a hydraulic tube 10 which transfers hydraulic power from a clutch master cylinder 1 to a release cylinder 3.

Referring to FIGS. 2A and 2B, the hydraulic tube 10 of the related art includes a pipe 11 made of steel, a connector 12 made of plastic which is fitted into and coupled with the pipe 11, and a sealer 13 made of rubber which is fitted into one end of the pipe 11 and is coupled with one end of the connector 12.

For the coupling between the pipe 11 and the connector 12, a pipe rib 11a having a triangular cross-section protrudes outward from the pipe 11, and a connector groove 12a is formed in the inner circumference of the connector 12 such that the pipe rib 11a is fitted into the connector groove 12a. The connector 12 also has a plurality of slots 12b on the outer circumference. The slots 12 are opened in the longitudinal direction of the connector 12.

The connector 12 is spread outwards at the slots 12b when the pipe 11 is being fitted into the connector 12. When fitting the pipe rib 11a into the connector groove 12a is completed, the pipe 11 and the connector 12 are assembled together while the connector 12 restores the original position from the outwardly spread position.

In addition, for the assembly between the connector 12 and the sealer 13, a connector rib 12c protrudes outward from the outer circumference of one end of the connector 12, and a sealer groove 13a is formed in the inner circumference of the sealer 13 such that the connector rib 12c is fitted into the sealer groove 13a. An inner rib 13b is formed on the inner circumferential portion of the sealer 13 from the sealer groove 13a to one end of the sealer 13 such that the inner rib 13b adjoins to the pipe 11.

The conventional hydraulic tube 10 is configured such that the connector 12 has the plurality of slots 12b. However, the slots 12b reduce the structural strength of the connector 12 which is made of plastic, which is problematic. In particular, this makes a mold for insert molding more complicated and increases cost.

In addition, in the conventional hydraulic tube 10, the connector 12 is spread outwards along the slots 12b when the connector 12 is being fitted around the pipe 11. When the connector 12 is permanently deformed in this process, a gap is formed between the pipe 11 and the connector 12, which disadvantageously leads to an oil leakage.

Furthermore, since the assembly between the pipe 11 and the connector 12 is accomplished by the pipe rib 11a and the connector groove 12a, the connector groove 12a is a factor that locally lowers the strength of a portion of the connector groove 12a when the pipe 11 and the connector 12 are assembled together. This consequently causes a permanent deformation in the portion of the connector groove 12a when the pipe 11 and the connector 12 are assembled together, which disadvantageously leads to an oil leakage.

In addition, while the overall sealing performance of the hydraulic tube 10 is determined by the contact portions of the pipe 11 and the sealer 13, the conventional sealing structure provides a seal by bringing only the inner rib 13b of the sealer 13 into the contact with the pipe 11. This structure of sealing the hydraulic tube 10 using the single contact structure of the inner rib 13b has an insignificant oil leak prevention effect, which is problematic.

Among the reference numerals that have not been described, the reference numeral 3 indicates a clutch pedal, and the reference numeral 4 indicates a manual transmission.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a hydraulic tube for a vehicle in which slots and a connector groove which are used in the related art are precluded from a plastic connector fabricated by insert molding. This consequently increases the structural strength of the connector, thereby further improving an oil leakage prevention effect. Cost can also be reduced by the simplification of a mold.

The present invention is also intended to improve a contact structure between a pipe and a sealer which determines the overall sealing performance of the hydraulic tube so as to have a dual contact structure, thereby improving the overall sealing performance and thus significantly improving the oil leakage prevention effect.

In an aspect of the present invention, a hydraulic tube for a vehicle may include a pipe having a pipe rib which is formed integrally on and protrudes outward from a terminal end of the pipe, a connector fitted around the pipe such that the pipe extends through opposite ends of the connector, and a sealer fitted into a first end of the connector, a first end of the sealer being coupled with the terminal end of the pipe through coupling with the pipe rib, and a second end of the sealer being coupled with the first end of the connector.

The connector may have a connector hole extending through the opposite ends of the connector, the pipe being fitted into the connector hole, wherein a diameter of the connector hole from a first end to a second end is equal.

In a section of the connector hole from the first end to the second end, no portion of the connector hole is connected to outside of the connector except for the opposite ends that are opened.

Portions of the connector hole from the first end to the second end adjoin to an outer circumference of the pipe.

The connector may include a continuous connector rib and a continuous connector groove to couple with the sealer on outer circumferences of the first end thereof which is disposed in a direction toward the pipe rib.

The sealer may include a sealer hole extending through opposite ends of the sealer, the first end of the pipe being to be fitted into the sealer through the sealer hole, and a first sealer groove at a first end of the sealer hole, the pipe rib being fitted into and coupled with the first sealer groove.

The first end of the connector in which the connector rib and the connector groove are formed is configured so as to be fitted into the second end of the sealer hole, and a continuous second sealer groove and a continuous inner rib are formed on the second end of the sealer hole, the second sealer groove being fitted around and coupled with the connector rib, and the continuous inner rib being fitted into and coupled with the connector groove.

The first sealer groove may include an inclined surface which is to be in face contact with the pipe rib, an extension surface extending from a terminal of the inclined surface toward the second end of the sealer so as to be parallel with the sealer hole, and a perpendicular surface connected to the sealer hole perpendicularly from a terminal of the extension surface.

The first sealer groove may include an enclosed space which is closely defined by the pipe rib, the extension surface, and the perpendicular surface in order to improve a performance of sealing between the pipe and the sealer and an oil leakage prevention effect.

The pipe is made of steel, the connector is made of plastic, and the sealer is made of rubber.

According to the present invention as set forth above, it is possible to increase the structural strength of the connector in order to prevent the connector from being permanently deformed during the assembly between the pipe and the connector, thereby further improving the oil leakage prevention effect. In particular, since the contact structure between the pipe and the sealer which determines the overall sealing performance of the hydraulic tube is improved so as to have a dual contact structure, it is possible to improve the overall sealing performance of the hydraulic tube and thus significantly improve the oil leakage prevention effect.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
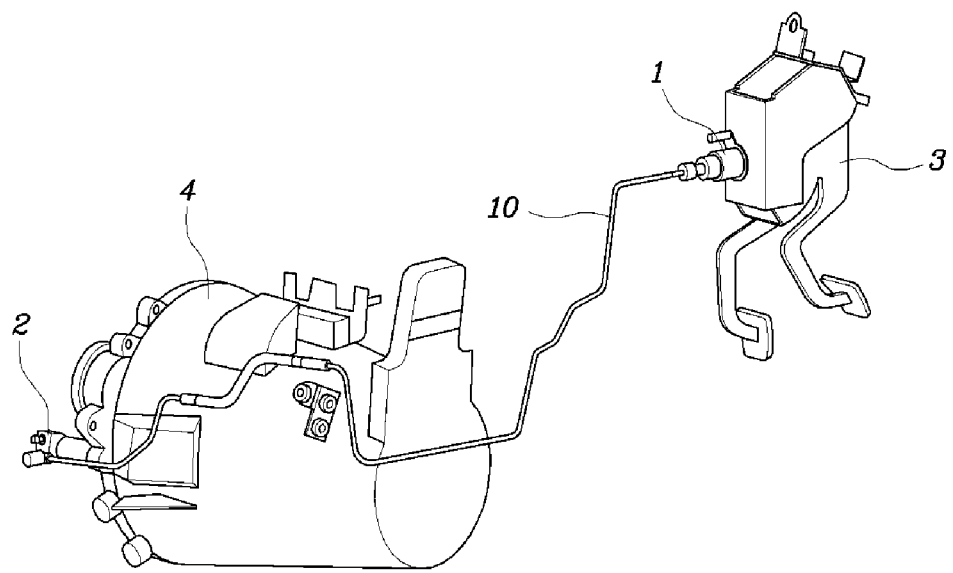
FIG. 1 is a schematic view illustrating a hydraulic clutch system according to an example of the use of a hydraulic tube.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention (s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Reference will now be made in greater detail to a hydraulic tube for a vehicle according to the present invention, an exemplary embodiment of which is illustrated in the accompanying drawings. Wherever possible, the same reference numerals will be used throughout the drawings and the description to refer to the same or like parts.

Figure 3:
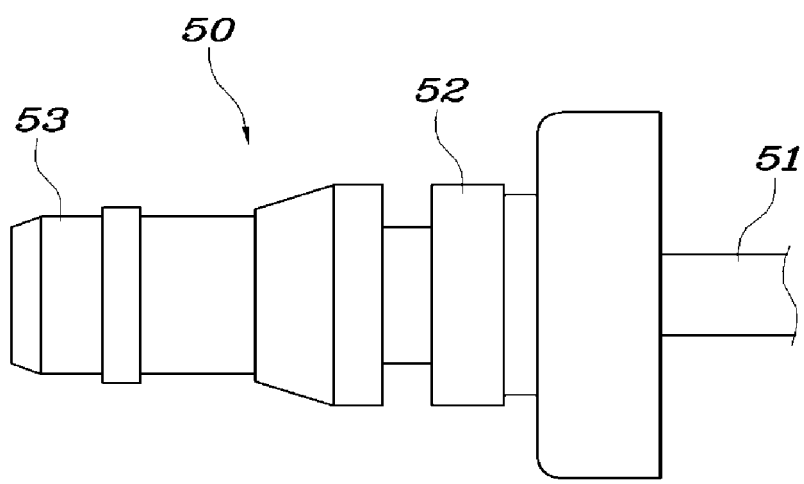
FIGS. 3 and 4 are side elevation and cross-sectional views illustrating the coupled state of a hydraulic tube according to an exemplary embodiment of the present invention.
Figure 4:
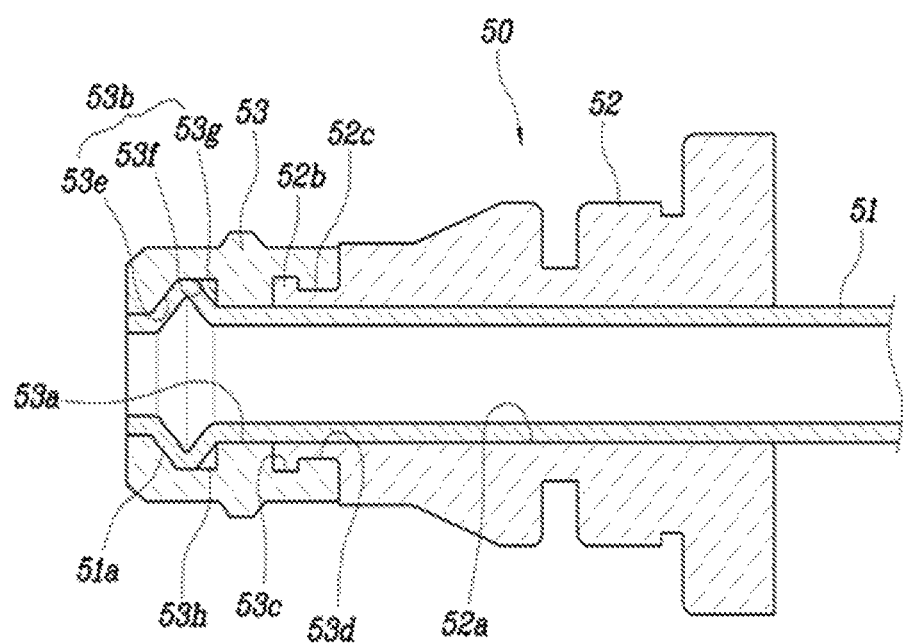

As shown in FIGS. 3 and 4, a hydraulic tube for a vehicle according to an exemplary embodiment of the present invention includes: a pipe 51 having a pipe rib 51a which is formed integrally on and protrudes outward from a terminal end of the pipe 51, a connector 52 fitted around the pipe 51 such that the pipe 51 extends through opposite ends of the connector 52, and a sealer 53 fitted into one end of the connector 52, one end of the sealer 53 being coupled with the pipe 51 through coupling with the pipe rib 51a, and another end of the sealer 53 being coupled with the connector 52.

The pipe 51 is made of steel, the connector 52 is made of plastic by injection molding, and the sealer 53 is made of an elastic rubber.

The connector 52 has a connector hole 52a extending through the opposite ends of the connector 52, in which the pipe 51 is fitted into the connector hole 52a. The diameter of the connector hole 52a from one end to another end is the same.

The connector 52 according to the present exemplary embodiment is configured such that the connector hole 52a does not have a conventional connector groove which would otherwise locally lower the strength of a portion of the connector. The structural strength of the connector 52 can be increased more than that of a conventional connector. In particular, there is no danger of causing a permanent deformation during the assembly with the pipe 51, and thus the effect of preventing oil leakage can be further improved, which is advantageous.

In addition, in a section of the connector hole 52a from one end to another end, no portion of the connector hole 52a is connected to the outside of the connector 52 except for the opposite ends that are opened.

In other words, the connector 52 according to the present exemplary embodiment is configured such that no slots which are opened in the longitudinal direction are provided, unlike in the conventional connector. This consequently makes it possible to prevent any danger of the permanent deformation during the assembled with the pipe 51, thereby further improving the oil leakage prevention effect.

In addition, the connector 52 according to the present exemplary embodiment is configured such that the connector hole 52a is provided with no groove as described above, and in particular, with no slots unlike in the conventional connector. This can consequently simplify the mold for insert molding, thereby reducing the cost of the mold and significantly reducing fabrication time.

Furthermore, the connector 52 according to the present exemplary embodiment is configured such that portions of the connector hole 52a from one end to another end adjoin to the outer circumference of the pipe 51. This configuration makes it possible to further improve the sealing performance between the pipe 51 and the connector 52, thereby further improving the oil leakage prevention effect.

For coupling with the sealer 53, a continuous connector rib 52b and a continuous connector groove 52c are formed on the outer circumference of one end of the connector 52 which is disposed in the direction toward the pipe rib 51a.

The sealer 53 has a sealer hole 53a which extends through opposite ends of the sealer 53 such that one end of the pipe 51 can be fitted into the sealer 53. The sealer 53 also has a first sealer groove 53b formed at one end of the sealer hole 53a, in which the pipe rib 51a is fitted into and coupled with the first sealer groove 53b.

In addition, one end of the connector 52 in which the connector rib 52b and the connector groove 52c are formed is configured such that it is fitted into another end of the sealer hole 53a. For the coupling between the connector 52 and the sealer 53, a continuous second sealer groove 53c and a continuous inner rib 53d are formed on another end of the sealer hole 53a. The second sealer groove 53c is fitted around and coupled with the connector rib 52b, and the inner rib 53d is fitted into and coupled with the connector groove 52c.

The first sealer groove 53b includes an inclined surface 53e which is to be in face contact with the pipe rib 51a, an extension surface 53f which extends from the terminal of the inclined surface 53e toward another end so as to be parallel with the sealer hole 53a, and a perpendicular surface 53g which is connected to the sealer hole 53a perpendicularly from the terminal of the extension surface 53f.

The first sealer groove 53b also has an enclosed space 53h which is closely defined by the pipe rib 51a, the extension surface 53f and the perpendicular surface 53g in order to improve the sealing performance between the pipe 51 and the sealer 53 and the oil leakage prevention effect.

In other words, in order to improve the sealing performance between the pipe 51 and the sealer 53 and thus further improve the oil leakage prevention effect, a first seal is formed through the face contact between the outer inclined surface of the pipe rib 51a and the inclined surface of the first sealer groove 53b, and a second seal is formed using the enclosed space that is defined through the fitting of the pipe rib 51a into the first sealer groove 53b.

Figure 5A:
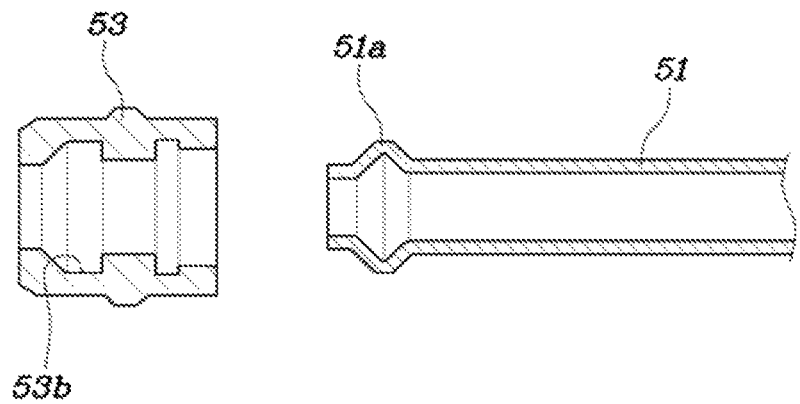
FIGS. 5A, 5B and 5C are views illustrating an assembly process of the hydraulic tube according to an exemplary embodiment of the present invention.
Figure 5B:
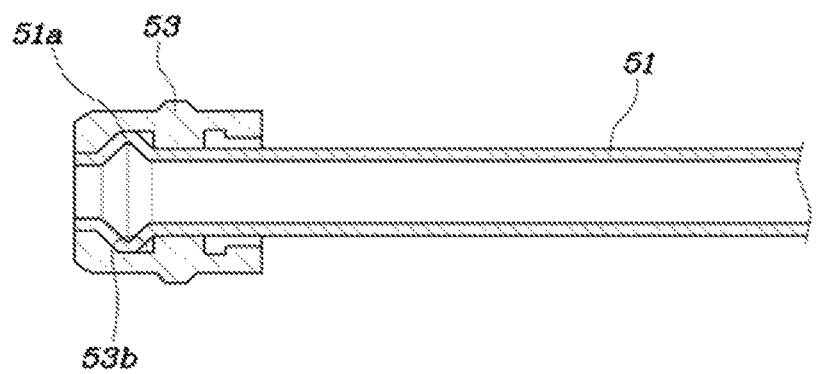
Figure 5C:
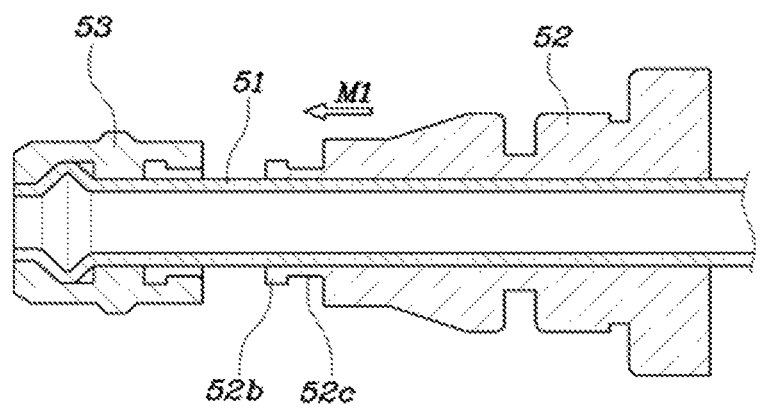

FIGS. 5A, 5B and 5C illustrate an assembly process of the hydraulic tube 50 according to an exemplary embodiment of the present invention.

First, the sealer 53 is fitted around one end of the pipe 51 having the pipe rib 51a from the position shown in FIG. 5A, and then is assembled with the pipe 51, as shown in FIG. 5B.

Since the sealer 53 is made of an elastic rubber, during the assembly with the pipe 51, the sealer 53 is elastically spread and then is contracted so as to be coupled with the pipe 51.

The pipe 51 and the sealer 53 are coupled with each other as the pipe rib 51a is fitted into the first sealer groove 53b.

When the assembly between the pipe 51 and the sealer 53 is completed in this manner, the connector 52 is fitted around the pipe 51, as shown in FIG. 5C. Finally, the connector 52 and the sealer 53 are coupled with each other, as shown in FIG. 4, thereby completing the assembly.

When the connector 52 is fitted around the pipe 51 for the assembly, fitting starts by fitting one end of the connector 52 on which the connector rib 52b and the connector groove 52c are formed around one end of the pipe 51 on which the pipe rib 51 is not formed. As shown in FIG. 5C, the assembly starts by fitting the connector 52 around the right end of the pipe 51 (in the direction indicated by an arrow M1).

The connector 52 and the sealer 53 are coupled with each other through the assembly between the connector rib 52b and the second sealer groove 53c and the assembly between the connector groove 52c and the inner rib 53d.

At this time, the elasticity of the sealer 53 facilitates the assembly between the connector 52 and the sealer 53.

When the assembly of the hydraulic tube 50 according to an exemplary embodiment of the present invention is completed as above, a dual contact structure is provided, i.e. the pipe 51 and the sealer 53 adjoin to each other at two places. This dual contact structure according to an exemplary embodiment of the present invention can advantageously lead to a significant improvement in the overall sealing performance over the conventional structure.

Figure 2A:
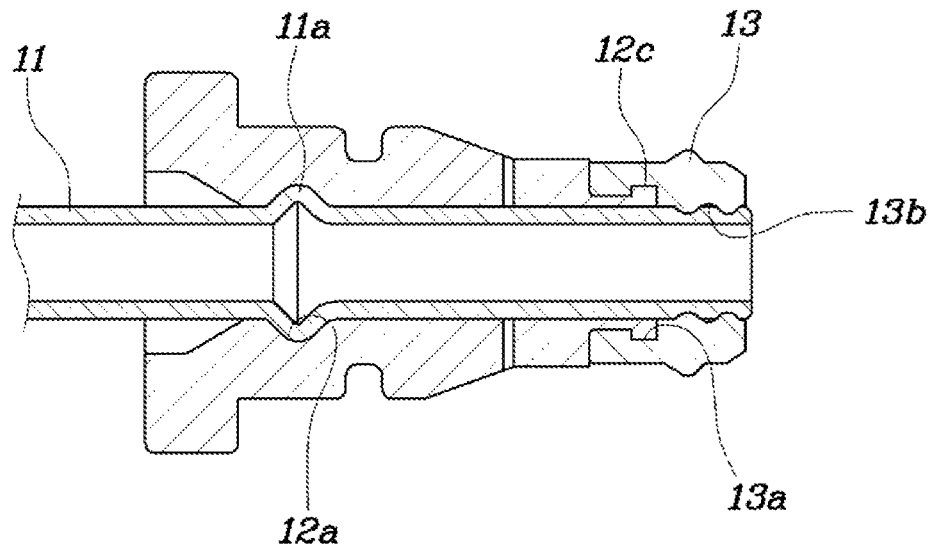
FIGS. 2A and 2B are schematic views illustrating a conventional hydraulic tube.
Figure 2B:
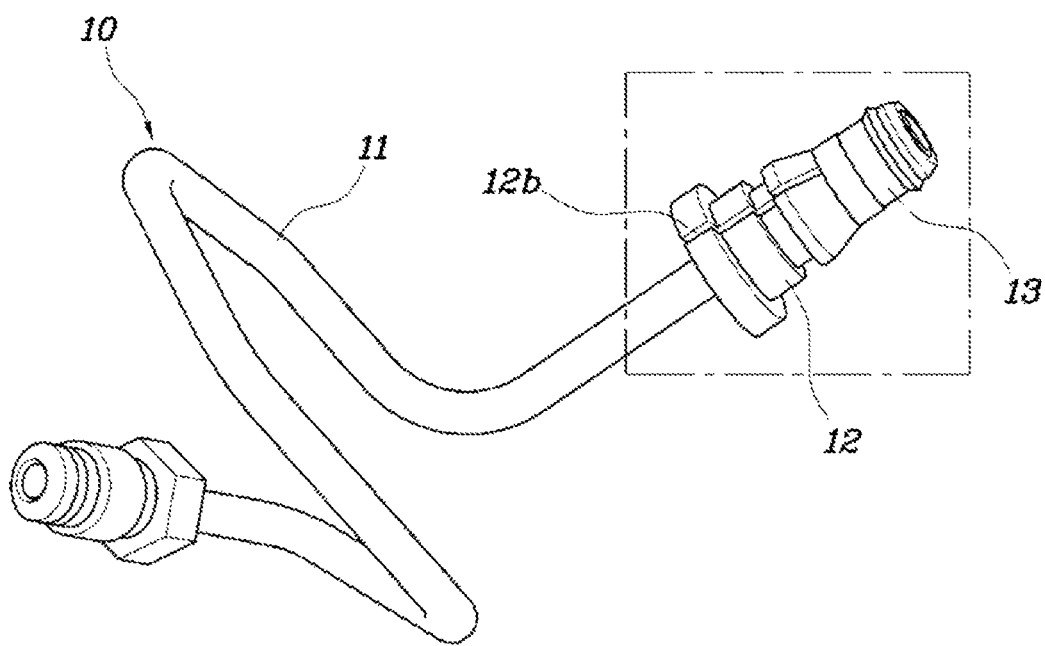

That is, the overall sealing performance of the hydraulic tube 50 is determined by the contact portions of the pipe 51 and the sealer 53. The conventional structure has a single contact structure in which only the inner rib 13b of the sealer 13 adjoins to the pipe 11 to provide a seal (see FIG. 1 and FIG. 2). This conventional structure disadvantageously leads to low overall sealing performance and an insignificant oil leakage prevention effect.

In contrast, the present invention provides the dual contact structure in which the sealer hole 53a and the outer circumference of the pipe 51 provide a first face contact structure, and the pipe rib 51a and the first sealer groove 53b provide a second face contact structure. The dual contact structure according to an exemplary embodiment of the present invention can significantly improve the sealing performance between the pipe 51 and the sealer 53 over the conventional single contact structure. This can consequently improve the overall sealing performance of the hydraulic tube 50 and thus significantly improve the oil leakage prevention effect.

In addition, according to an exemplary embodiment of the present invention, when the pipe rib 51a is fitted into the first sealer groove 53b during the assembly between the pipe 51 and the sealer 53, the outer inclined surface of the pipe rib 51a and the inclined surface of the first sealer groove 53b come into face contact, thereby forming the first seal, and the enclosed space 53h is closely defined by the pipe rib 51a and the extension surface 53f and the perpendicular surface 53g of the first sealer groove 53b, thereby forming the second seal. This can consequently improve the overall sealing performance of the hydraulic tube 50 and thus significantly improve the oil leakage prevention effect.

As set forth above, the hydraulic tube 50 according to an exemplary embodiment of the present invention can prevent the connector 52 from being permanently deformed during the assembly between the pipe 51 and the connector 52 by increasing the structural strength of the connector 52 and thus further improve the oil leakage prevention effect.

In addition, the connector 52 according to an exemplary embodiment of the present invention is configured such that the connector hole 52a is provided with no groove unlike the conventional structure, and in particular, with no slots that are opened in the longitudinal direction. This can consequently simplify the mold for insert molding, thereby reducing the cost of the mold and fabrication time and improving productivity.

Furthermore, according to an exemplary embodiment of the present invention, the contact structure of the pipe 51 and the sealer 53 which determines the overall sealing performance of the hydraulic tube 50 is the dual contact structure. In particular, a dual seal structure is provided through the assembly between the pipe rib 51a and the first sealer groove 53b. This makes it possible to significantly improve the sealing performance between the pipe 51 and the sealer 53, thereby improving the overall sealing performance of the hydraulic tube 50 and thus significantly improving the oil leakage prevention effect.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A hydraulic tube for a vehicle comprising:
   a pipe having a pipe rib which is formed integrally on and protruded outward in a radial direction of the pipe from an end of the pipe;
   a connector fitted around the pipe such that the pipe extends through opposite ends of the connector; and
   a sealer fitted into a first end of the connector, a first end of the sealer being coupled with the end of the pipe through coupling with the pipe rib, and a second end of the sealer being coupled with the first end of the connector,
   wherein the sealer comprises:
      a sealer hole extending through opposite ends of the sealer, a first end of the pipe being to be fitted into the sealer through the sealer hole; and
      a first sealer groove at a first end of the sealer hole, the pipe rib being fitted into and coupled with the first sealer groove,
   wherein the first sealer groove comprises:
      an inclined surface which is to be in face contact with the pipe rib;
      an extension surface extending from a terminal of the inclined surface toward the second end of the sealer so as to be parallel with the sealer hole;
      a perpendicular surface connected to the sealer hole perpendicularly from a terminal of the extension surface; and
      an enclosed space which is closely defined by the pipe rib, the extension surface; and the perpendicular surface in order to improve a performance of sealing between the pipe and the sealer and an oil leakage prevention effect.

2. The hydraulic tube according to claim 1, wherein the connector has a connector hole extending through the opposite ends of the connector, the pipe being fitted into the connector hole, wherein a diameter of the connector hole from a first end to a second end of the connector hole is equal.

3. The hydraulic tube according to claim 2, wherein, in a section of the connector hole from the first end to the second end of the connector hole, no portion of the connector hole is connected to outside of the connector except for the opposite ends that are opened.

4. The hydraulic tube according to claim 2, wherein portions of the connector hole from the first end to the second end of the connector hole adjoin to an outer circumference of the pipe.

5. The hydraulic tube according to claim 1, wherein the connector comprises a continuous connector rib and a continuous connector groove to couple with the sealer on outer circumferences of the first end thereof which is disposed in a direction toward the pipe rib.

6. The hydraulic tube according to claim 1,
   wherein the first end of the connector in which the connector rib and the connector groove are formed is configured so as to be fitted into the second end of the sealer hole, and
   wherein a continuous second sealer groove and a continuous inner rib are formed on the second end of the sealer hole, the second sealer groove being fitted around and coupled with the connector rib, and the continuous inner rib being fitted into and coupled with the connector groove.

7. The hydraulic tube according to claim 1, wherein the pipe is made of steel, the connector is made of plastic, and the sealer is made of rubber.

* * * * *